(12) United States Patent
Walczak et al.

(10) Patent No.: US 12,414,222 B2
(45) Date of Patent: Sep. 9, 2025

(54) DRIVER FOR A PARTICLE ACCELERATOR

(71) Applicant: Oxford University Innovation Limited, Oxford (GB)

(72) Inventors: Roman Walczak, Oxford (GB); Oscar Jakobsson, Oxford (GB); Simon Hooker, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 107 days.

(21) Appl. No.: 18/564,153

(22) PCT Filed: Jun. 1, 2022

(86) PCT No.: PCT/GB2022/051390
§ 371 (c)(1),
(2) Date: Nov. 27, 2023

(87) PCT Pub. No.: WO2022/254207
PCT Pub. Date: Dec. 8, 2022

(65) Prior Publication Data
US 2024/0244738 A1 Jul. 18, 2024

(30) Foreign Application Priority Data
Jun. 2, 2021 (GB) ...................... 2107875

(51) Int. Cl.
*H05H 15/00* (2006.01)
*H01S 3/00* (2006.01)
*H01S 3/23* (2006.01)

(52) U.S. Cl.
CPC ........... *H05H 15/00* (2013.01); *H01S 3/0057* (2013.01); *H01S 3/2383* (2013.01)

(58) Field of Classification Search
CPC ...... H05H 15/00; H01S 3/0057; H01S 3/2383
See application file for complete search history.

(56) References Cited

U.S. PATENT DOCUMENTS 6,345,058 B1 * 2/2002 Hartemann ............ G21K 1/003
372/2
10,524,344 B2 * 12/2019 Milchberg ............. H05H 15/00
(Continued)

FOREIGN PATENT DOCUMENTS

CN 105826479 B * 1/2018 .......... H01L 27/3211
CN 110 676 685 A 1/2020
(Continued)

OTHER PUBLICATIONS

International Search Report and Written Opinion for WO 2022/254207 (PCT/GB2022/051390), dated Jul. 27, 2022, pp. 1-20.
(Continued)

*Primary Examiner* — Adam D Houston
(74) *Attorney, Agent, or Firm* — Thomas|Horstemeyer, LLP (57) ABSTRACT

A driver (1) for a plasma particle accelerator includes a plasma (10) and laser system(s) (2) that generate first and second pulses. The first pulse (4) has a duration less than the electron plasma period. The second pulse (6) is temporally smooth and has a duration greater than the electron plasma period and less than the ion plasma period. The first pulse generates a plasma wake and the second pulse interacts with the wake to form red and blue-shifted sidebands. The driver also includes a dispersive optical device (20) that introduces a chromatic dispersion to shift the spectral phases of the red and blue-shifted sidebands, to temporally shift them relative to each other, so as to form coincident pulses (22) for generating a plasma wake in a plasma particle accelerator (26).

20 Claims, 7 Drawing Sheets

(56) References Cited

U.S. PATENT DOCUMENTS

| | | | | |
|---|---|---|---|---|
| 2017/0332468 A1* | 11/2017 | Milchberg | | H05H 15/00 |
| 2019/0035594 A1* | 1/2019 | Nikipelov | | H01S 3/0903 |
| 2023/0261428 A1* | 8/2023 | Richardson | | H01S 3/10023 |
| | | | | 372/25 |

FOREIGN PATENT DOCUMENTS

| | | | | | |
|---|---|---|---|---|---|
| CN | 117578164 A | * | 2/2024 | | G02F 1/353 |
| CN | 119742648 A | * | 4/2025 | | |
| DE | 102015113477 A1 | * | 9/2016 | | H01L 27/3209 |
| JP | 2024523855 A | * | 7/2024 | | |
| WO | WO-2008032050 A1 | * | 3/2008 | | H05G 2/00 |
| WO | WO-2012177561 A2 | * | 12/2012 | | H05H 15/00 |
| WO | WO-2022200616 A1 | * | 9/2022 | | H01H 1/54 |
| WO | WO-2022254207 A1 | * | 12/2022 | | H01S 3/0057 |

OTHER PUBLICATIONS

UK Search Report for GB 2107875.3, dated Feb. 17, 2022, pp. 1-5.

Kalmykov Serguei et al: "Compression of Laser Radiation in Plasmas Using Electromagnetic Cascading", Physical Review Letters, vol. 94, No. 23, Jun. 1, 2005 (Jun. 1, 2005), XP055885726, us ISSN: 0031-9007, DOI: 10.1103/PhysRevLett.94.235001 pp. 235001-1.

Le Blanc S. P. et al: "Temporal characterization of a self-modulated laser wakefield", The Seventh Workshop On Advanced Accelerator Concepts, Jan. 1, 1997 (Jan. 1, 1997), pp. 651-663, XP055885784, DOI: 10.1063/1.53069 ISBN: 978-1-56396-697-2 p. 651-p. 661.

Chen W.-T. et al: "Optically Controlled Seeding of Raman Forward Scattering and Injection of Electrons in a Self-Modulated Laser-Wakefield Accelerator", Physical Review Letters, vol. 92, No. 7, Feb. 1, 2004 (Feb. 1, 2004), XP055885723, us ISSN: 0031-9007, DOI: 10.1103/PhysRevLett.92.075003 pp. 075003-1, left-hand column paragraph 1—pp. 075003-4.

Moore C. I. et al: "Accelerated electron measurements in the self-modulated laser wakefield accelerator", The Seventh Workshop On Advanced Accelerator Concepts, Jan. 1, 1997 (Jan. 1, 1997), pp. 400-407.

Sprangle P et al: "Laser Beat Wave Electron Accelerator", IEEE Transactions On Nuclear Science, IEEE, USA, vol. 34, No. 3, Jun. 1, 1981 (Jun. 1, 1981), pp. 3346-3348.

Grigsby F.: "Development of 873 nm Raman Seed Pulse for Raman-seeded Laser Wakefield Acceleration", AIP Conference Proceedings, vol. 737, Jan. 1, 2004 (Jan. 1, 2004), pp. 559-563.

\* cited by examiner

DRIVER FOR A PARTICLE ACCELERATOR

GOVERNMENT SUPPORT CLAUSE

This invention was made with government support under Award no FA9550-18-1-7005 awarded by the Air Force Office of Scientific Research. The government has certain rights in the invention.

CROSS-REFERENCE TO RELATED APPLICATIONS

This application is the National Stage of International Application No. PCT/GB2022/051390, filed Jun. 1, 2022, which claims priority to GB 2107875.3, filed Jun. 2, 2021, which are entirely incorporated herein by reference.

This invention relates to a driver for a particle accelerator, in particular to a laser driver for a plasma accelerator.

Particle accelerators are used for a wide variety of applications. Most accelerators employ radio frequency (RF) fields to accelerate charged particles. Such accelerators operate with a repetition rate at and above a few kHz. This enables a high flux of accelerated particles to be provided and aids stable operation of the accelerator via feedback and feedforward loops. However, the maximum electric field that can be used for RF acceleration is limited by electric breakdown, meaning that accelerators for accelerating particles to very high energies are very large, which makes them expensive to build and run.

Plasma accelerators, particularly using an intense laser pulse as the driver, offer a way to provide more compact particle accelerators. This should also help to reduce the cost of particle accelerators. However, the titanium:sapphire lasers currently used as the drivers for such plasma accelerators typically have low repetition rates (generally less than 10 Hz) and very low wall-plug efficiencies (generally less than 1%). This makes it very difficult, if not practically impossible, to scale plasma accelerators to deliver the high mean currents that are obtainable from conventional RF accelerators and required by many applications.

It is an aim of the present invention to provide an improved driver for a plasma accelerator.

When viewed from a first aspect the invention provides a driver for a plasma particle accelerator, the driver comprising:
a volume of plasma;
a first laser system arranged to generate a first laser pulse,
  wherein the first laser pulse has a duration that is less than the electron plasma period of the plasma,
  wherein the first laser system is arranged to direct the first laser pulse into the volume of plasma, and
  wherein the first laser pulse is arranged to generate a plasma wake in the volume of plasma; and
the first laser system or a second laser system arranged to generate a second laser pulse,
  wherein the second laser pulse is temporally smooth and has a duration that is greater than the electron plasma period and less than the ion plasma period of the plasma,
  wherein the first laser system or the second laser system is arranged to direct the second laser pulse into the volume of plasma, and
  wherein the second laser pulse is arranged to interact with the plasma wake to form a plurality of red-shifted regions and a plurality of blue-shifted regions along the length of the second laser pulse, thus forming a plurality of red-shifted sidebands and a plurality of blue-shifted sidebands in the spectrum of the second laser pulse;
wherein the driver further comprises:
  a dispersive optical device arranged to receive the second pulse having the plurality of red-shifted regions and the plurality of blue-shifted regions,
    wherein the dispersive optical device is arranged to introduce a chromatic dispersion in the second laser pulse, so as to shift the spectral phases of the plurality of red-shifted sidebands and the plurality of blue-shifted sidebands, so as to temporally shift the plurality of red-shifted regions and the plurality of blue-shifted regions relative to each other, so as to form a plurality of coincident pulses for generating a plasma wake in a plasma particle accelerator.

The present invention provides a driver for a plasma particle accelerator, in particular a driver that can be used to generate a train of pulses which, in turn, can be used to generate (e.g. resonantly excite) a wake in a plasma particle accelerator, for example.

The driver includes a volume of plasma, a first laser system, optionally a second laser system, and a dispersive optical device. The first laser system is configured and operable to generate a first (short) laser pulse having a duration (pulse length) that is less than the electron plasma period of the plasma in the plasma volume. The first laser system, or an additional second laser system, is configured and operable to generate a second (long) laser pulse that is temporally smooth (i.e. smoothly varying in the time domain). The duration of the second laser pulse is greater than the electron plasma period and less than the ion plasma period of the plasma in the plasma volume, i.e. the second pulse is longer than the first pulse.

The first laser system (and the second laser system when provided) are configured and operable to direct the first and second laser pulses into the plasma volume. The first laser pulse acts to generate a plasma wake in the plasma, owing to its duration being less than the electron plasma period. The plasma in the plasma volume is, in simple terms, an ionised gas, and is preferably arranged to propagate laser pulses, which are directed into the plasma volume, through the plasma volume.

The second laser pulse interacts with the plasma wake set up in the plasma volume by the first laser pulse, which spectrally (i.e. frequency) modulates (i.e. spectrally phase modulates) the (temporal phase of the) second laser pulse to form multiple red and blue shifted sidebands ("satellites") in the spectrum of the second laser pulse. Thus the (e.g. single frequency, narrow bandwidth) smooth second laser pulse is converted from a single pulse into a, still predominantly smooth, pulse along which there are red and blue shifted regions, i.e. the second pulse acquires a (preferably periodic) spectral phase modulation having these red and blue shifted components.

The spectrally phase-modulated second (longer) laser pulse, formed from the initial (e.g. narrow bandwidth) smooth second laser pulse, is then directed to the dispersive optical device. The dispersive optical device is configured and operable to introduce a chromatic dispersion that shifts the spectral phases of the spectral sidebands relative to each other, so as to compensate for the frequency chirp.

This results in corresponding red and blue shifted regions (i.e. components of the second laser pulse which beat with each other) being overlapped temporally to form a train of multiple coincident (and thus more intense) pulses.

Thus, the predominantly smooth, spectrally modulated, second (long) laser pulse is converted from a single pulse into a train of multiple pulses.

This train of multiple coincident pulses may then be used, e.g. in a (further) plasma volume, to generate plasma wakes in a plasma particle accelerator that can be used to accelerate charged particles.

By creating a periodic spectral phase modulation along the long pulse, where the red and blue shifted regions are then made coincident with each other, a train of narrow, intense pulses may be formed. This train of narrow pulses is then suitable for injecting into a plasma particle accelerator, to generate the wake fields necessary for particle (e.g. electron) acceleration.

It will be appreciated that this technique is able to exploit the use, for example, of contemporary laser technology (e.g. thin-disk, fibre and diode lasers) that have a high average-power (e.g. multi-kW), a relatively high optical-to-optical efficiency (e.g. 50%), a relatively high wall-plug efficiency (e.g. 10%) and a high (e.g. multi-kHz) repetition rate, but a relatively narrow bandwidth and therefore relatively long pulse duration, in order to generate a series of relatively high intensity pulses at a high repetition rate, that are desired by many accelerator applications (e.g. free-electron lasers (FELs), synchrotron light sources, X-ray imaging, very-high-energy-electron (VHEE) radiotherapy and particle physics).

The present invention may therefore provide a mechanism for converting the high average-power, a relatively high optical-to-optical and wall-plug efficiency and a high repetition rate of such lasers, into an effective driver for plasma particle accelerators.

The plasma volume may comprise any suitable and desired volume of plasma in which it is possible to generate a plasma wake with the first laser pulse from the first laser system. In one embodiment the volume of plasma comprises a plasma waveguide comprising (e.g. containing) a plasma. Preferably the plasma waveguide is arranged to guide the first laser pulse from the first laser system.

In one embodiment the plasma volume (e.g. waveguide) comprises one or more side walls, e.g. extending parallel to each other along the length of the volume, arranged to confine the plasma in the plasma volume. Preferably the plasma waveguide comprises a gradient refractive index plasma waveguide.

The plasma volume (e.g. waveguide), that acts to guide the laser pulses and to set up the wake in the plasma, etc., may be set up by the (e.g. solid) side wall(s) or may be set up by the plasma itself. Thus, for example, the structure (e.g. side walls) of the plasma volume that contains the plasma may not necessarily comprise a waveguide itself; rather, in some embodiments, the waveguide is formed inside the plasma itself. In some embodiments, the plasma waveguide is formed in the plasma when the first pulse is incident upon the plasma of the plasma volume.

In one embodiment the plasma volume (e.g. waveguide) comprises an optical fibre containing a plasma, a (e.g. dielectric) capillary tube containing a plasma, a capillary discharge waveguide containing a plasma or a hydrodynamic expansion plasma channel.

The plasma volume may have any suitable and desired dimensions. Preferably the plasma volume (e.g. waveguide) has a length (parallel to the direction in which the laser pulses are directed through the plasma volume (e.g. along the plasma waveguide)) that is (e.g. significantly) greater than its width (perpendicular to the direction in which the laser pulses are directed through the plasma volume (e.g. along the plasma waveguide)). Preferably the plasma volume (e.g. waveguide) is at least 5 cm long (in the direction along which the laser pulses propagate), e.g. at least 10 cm long, e.g. at least 20 cm long, e.g. at least 50 cm long, e.g. at least 1 m long. This length of plasma helps to build up a sufficient red and blue shift in the second laser pulse. This helps to form the plurality of red-shifted sidebands and the plurality of blue-shifted sidebands in the spectrum of the second laser pulse, which in turn helps to form high-intensity peaks when the spectral phases of the sidebands is shifted relative to each other by the dispersive optical device.

The plasma of the plasma volume may have any suitable and desired density. Preferably the (electron) density of the plasma is less than $1 \times 10^{18}$ cm$^{-3}$, e.g. less than $5 \times 10^{17}$ cm$^{-3}$, e.g. less than $2 \times 10^{17}$ cm$^{-3}$, e.g. less than $1 \times 10^{17}$ cm$^{-3}$, e.g. approximately $2.5 \times 10^{17}$ cm$^{-3}$. A relatively low density plasma helps to reduce laser instabilities in the plasma and helps to impart more energy into the plasma wake by extending the distance over which particles may be accelerated allow a lower energy laser (or lasers) to be used.

It will be understood by those skilled in the art that the electron plasma frequency, $\omega_{pe}$, and thus the electron plasma period, $\tau_{pe}$, are determined by the electron plasma density. The electron plasma frequency is given by $$\omega_{pe} = \sqrt{e^2 n_e / m_e \epsilon_0},$$

where e is the electron charge, $n_e$ is the electron (number) density of the plasma, $m_e$ is the electron mass and co is the vacuum permittivity. The electron plasma period is given by $\tau_{pe} = 2\pi/\omega_{pe}$. Similarly, the ion plasma frequency, $\omega_{pi}$, and thus the ion plasma period, $\tau_{pi}$, are determined by the ion plasma density. The ion plasma frequency is given by $$\omega_{pi} = \sqrt{e^2 n_e / m_i \epsilon_0},$$

where e is electron charge, $n_e$ is the electron (number) density (and thus ion (number) density) of the plasma, $m_i$ is the ion mass and $\epsilon_0$ is the vacuum permittivity. The ion plasma period is given by $\tau_{pi} = 2\pi/\omega_{pi}$.

The first laser system is arranged to generate a first laser pulse. Preferably the first laser system comprises a first laser arranged to generate the first laser pulse (and, e.g., the second laser pulse). The first laser system may comprise any suitable and desired optics (e.g. mirrors and/or lenses) to direct and/or focus the first (and, e.g., second) laser pulse(s) into the plasma volume.

The first laser may be any suitable and desired laser. In one set of embodiments the first laser comprises a thin-disk laser (or laser system), a fibre laser (or laser system) or a diode laser (or laser system). For example, the first laser may comprise a Yb:YAG (thin-disk) laser or a Titanium:Sapphire laser.

The first laser may have (be configured to be operated at) any suitable and desired (e.g. average) power. In one set of embodiments the first laser has (is configured to be operated at) a mean power that is greater than 100 W, e.g. greater than 500 W, e.g. greater than 1 kW.

The first laser may have (be configured to be operated at) any suitable and desired repetition rate. In one set of embodiments the first laser has a repetition rate that is greater than 100 Hz, e.g. greater than 500 Hz, e.g. greater than 1 kHz, e.g. greater than 2 kHz.

Preferably the first laser pulse is a single (i.e. isolated) laser pulse and thus preferably the first laser system is arranged to generate a single (i.e. isolated) laser pulse. Preferably the first laser pulse is linearly polarised and thus preferably the first laser system is arranged to generate a linearly polarised laser pulse. Preferably the first laser pulse has a polarisation that is perpendicular to the (e.g. linear) polarisation of the second laser pulse.

The first laser pulse may have any suitable and desired energy. In one set of embodiments the first laser system is arranged to generate the first laser pulse having an energy between 10 mJ and 200 mJ, e.g. between 20 mJ and 100 mJ, e.g. approximately 50 mJ.

The first laser may be arranged to operate at any suitable and desired frequency. In one set of embodiments the first laser is arranged to generate the first laser pulse with a frequency between $3\times10^{13}$ Hz and $3\times10^{15}$ Hz, e.g. between $5\times10^{13}$ Hz and $1\times10^{15}$ Hz, e.g. between $1\times10^{14}$ Hz and $5\times10^{14}$ Hz, e.g. approximately $3\times10^{14}$ Hz.

The first laser system is arranged to generate the first pulse such that it has a pulse duration that is less than the electron plasma period of the plasma in the plasma volume. In a preferred embodiment the first laser system is arranged to generate the first pulse such that it has a duration that is less than half the electron plasma period. In a preferred embodiment the first laser system is arranged to generate the first pulse such that it has a duration that is less than 500 fs long, e.g. less than 200 fs long, e.g. less than 100 fs long, e.g. approximately 40 fs long.

The first laser system is arranged to direct the first laser pulse into (i.e. be incident upon) the (plasma in the) plasma volume. Therefore, preferably the (e.g. first laser of the) first laser system is optically coupled to the plasma volume, such that the first laser pulse is directed into (is incident upon) the plasma in the plasma volume. Preferably the plasma volume is arranged to receive the first laser pulse from the first laser (system).

The incidence of the first laser pulse upon the plasma in the plasma volume is arranged to generate a plasma wake in the plasma volume. Thus the first laser system is arranged to generate the first laser pulse to excite a (e.g. linear) plasma wake in the volume.

When the first "seed" laser pulse propagates through the plasma in the plasma volume, the free electrons in the plasma are pushed away from the laser pulse by the ponderomotive force. The electrons are pulled back towards their original positions by the positive ions, but their momentum causes them to overshoot and subsequently to oscillate about their initial position. The separation of electrons and ions, forced by the laser pulse, excites a longitudinal electron density wave (the plasma wake), which trails the driving (first) laser pulse.

Preferably the plasma wake has an amplitude (in the variation of the plasma density, δn, from the mean plasma density) of less than 10%, e.g. less than 5%, e.g. less than 2%, e.g. approximately 1%. Thus preferably the first laser system is arranged to generate the first laser pulse to generate a plasma wake in the plasma volume having an amplitude (in the variation of the plasma density, δn, from the mean plasma density) of less than 10%, e.g. less than 5%, e.g. less than 2%, e.g. approximately 1%.

The first laser system, or a second (i.e. different, separate) laser system, is arranged to generate a second laser pulse. Thus, the driver may comprise a first laser system arranged to generate the first and second laser pulses (i.e. the same laser to generate both pulses), or the driver may comprise a first laser system arranged to generate the first laser pulse and a second laser system arranged to generate the second laser pulse (i.e. different lasers to generate the respective pulses).

In one set of embodiments, the first laser system is arranged to generate a second laser pulse. The first laser system may generate the first and second laser pulses separately, e.g. one after the other (such that the second laser pulse arrives into the plasma volume after the first laser pulse). However, preferably the first laser system is arranged to generate an initial laser pulse, and to generate the first laser pulse and the second laser pulse from the initial laser pulse.

Preferably the first laser system comprises a beamsplitter arranged to split the initial laser pulse into the first laser pulse and the second laser pulse. Preferably the first laser system is arranged to generate the initial laser pulse having a duration that is substantially equal to the duration of the first laser pulse. Thus the first laser system may, after generating the initial laser pulse, allow the duration of the initial laser pulse not to be modulated when generating the first laser pulse.

Preferably the first laser system is (e.g. comprises a compressor) arranged to compress the initial laser pulse (e.g. after the initial laser pulse has been split) to generate the second laser pulse, such that the duration of the second laser pulse is less than a duration of the initial laser pulse. Thus, the first laser system may be arranged to generate a longer initial laser pulse that (e.g. a part of) is then compressed into a shorter second laser pulse.

In one embodiment the first laser system is (e.g. comprises an optical element) arranged to spectrally broaden the initial laser pulse (e.g. after the initial laser pulse has been split) to generate the second laser pulse. This helps to then compress the initial laser pulse to generate the second laser pulse.

When the first and second laser pulses are generated from the (same) initial laser pulse, the first laser system may be arranged to introduce a delay in the second laser pulse, such that the second laser pulse arrives into the plasma volume after the first laser pulse. For example, the optical path length along which the second laser pulse travels through the first laser system may be greater than the optical path length along which the first laser pulse travels through the first laser system.

In one set of embodiments, the second laser system is arranged to generate a second laser pulse. In these embodiments, the first laser of the first laser system may be arranged to generate first laser pulse having the duration of the first laser pulse that is introduced into the plasma volume and the second laser of the second laser system may be arranged to generate second laser pulse having the duration of the second laser pulse that is introduced into the plasma volume, e.g. the first and/or second laser systems may not need to modulate the pulse durations of the first and/or second laser pulses but may instead use lasers that are arranged to initially generate the first and/or second laser pulses at the required duration(s).

When the driver comprises a second laser system (i.e. in addition to the first laser system), preferably the second laser system comprises a second laser arranged to generate the second laser pulse. The second laser may comprise any suitable and desired laser. In one set of embodiments the second laser comprises a thin-disc laser, a fibre laser or a diode laser. For example, the second laser may comprise a Yb:YAG (thin-disk) laser or a Titanium:Sapphire laser.

The second laser system may comprise any suitable and desired optics (e.g. mirrors and/or lenses) to direct and/or focus the second laser pulse into the plasma volume.

The second laser may have (be configured to be operated at) any suitable and desired (e.g. average) power. In one set of embodiments the second laser has (is configured to be operated at) a mean power that is greater than 100 W, e.g. greater than 500 W, e.g. greater than 1 kW.

The second laser may have (be configured to be operated at) any suitable and desired repetition rate. In one set of embodiments the second laser has a repetition rate that is greater than 100 Hz, e.g. greater than 500 Hz, e.g. greater than 1 kHz, e.g. greater than 2 kHz, e.g. greater than 10 KHz.

Preferably the second laser pulse is a single (i.e. isolated) laser pulse and thus preferably the first or second laser system is arranged to generate a single (i.e. isolated) laser pulse. Preferably the second laser pulse is linearly polarised and thus preferably the first or second laser system is arranged to generate a linearly polarised laser pulse. Preferably the second laser pulse has a polarisation that is perpendicular to the (e.g. linear) polarisation of the first laser pulse.

The second laser pulse may have any suitable and desired energy. In one set of embodiments the first (or second) laser system is arranged to generate the second laser pulse having an energy between 100 mJ and 2 J, e.g. between 200 mJ and 1 J, e.g. approximately 500 mJ.

Preferably the second laser pulse has a frequency (and thus wavelength) that is substantially equal to the frequency (and thus wavelength) of the first laser pulse. Thus preferably the first (or second) laser is arranged to generate the first and second laser pulses at substantially the same frequency (and thus wavelength). This helps the first and second laser pulses to propagate at substantially the same speed through the plasma volume. Thus, in one set of embodiments the first (or second) laser is arranged to generate the second laser pulse with a frequency between $3\times10^{13}$ Hz and $3\times10^{15}$ Hz, e.g. between $5\times10^{13}$ Hz and $1\times10^{15}$ Hz, e.g. between $1\times10^{14}$ Hz and $5\times10^{14}$ Hz, e.g. approximately $3\times10^{14}$ Hz.

The second laser pulse is (temporally) smooth. Thus preferably the gradient of the amplitude of the second laser pulse with respect to time is smooth. Preferably the second laser pulse has a single peak.

The second laser pulse has a pulse duration that is greater than the electron plasma period of the plasma in the plasma volume and less than the ion plasma period of the plasma. Preferably the second laser pulse has a pulse duration that is greater than two times the electron plasma period of the plasma in the plasma volume, e.g. greater than five times the electron plasma period, e.g. greater than ten times the electron plasma period, e.g. greater than twenty times the electron plasma period. Preferably the second laser pulse has a pulse duration that is less than half the ion plasma period of the plasma, e.g. less than a third of the ion plasma period of the plasma, e.g. less than a third of the ion plasma period of the plasma. In a preferred embodiment the first or second laser system is arranged to generate the second pulse such that it has a duration that is between 100 fs and 10 ps long, e.g. between 200 fs and 5 ps, e.g. between 500 fs and 2 ps, e.g. approximately 1 ps long.

The first or second laser system is arranged to direct the second laser pulse into (i.e. be incident upon) the (plasma in the) plasma volume. Therefore, preferably the (e.g. second laser of the) second laser system (when provided) is optically coupled to the plasma volume, such that the second laser pulse is directed into (is incident upon) the plasma in the plasma volume. Preferably the plasma volume is arranged to receive the second laser pulse from the second laser (system).

The first or second laser system may be arranged to generate and direct the second laser pulse into the plasma volume at any suitable and desired time, relative to the first laser pulse, so that the second laser pulse is able to interact with the plasma wake formed by the incidence of the first laser pulse on the plasma in the plasma volume. Preferably the first or second laser system is arranged to generate the second laser pulse at a time after the first laser pulse, such that the second laser pulse is incident upon the plasma in the plasma volume after the first laser pulse.

Preferably the first or second laser system is arranged to direct the first and second laser pulses into the plasma volume such that they co-propagate in the plasma volume. Preferably the first or second laser system is arranged to direct the second laser pulse into the plasma volume such that it is coincident with the plasma wake formed by the incidence of the first laser pulse on the plasma in the plasma volume. Thus, preferably the first or second laser system is arranged to direct the first and second laser pulses into the plasma volume such that the second pulse and the plasma wake co-propagate in the plasma volume.

Preferably the plasma volume is arranged such that the second pulse and the plasma wake co-propagate in the plasma volume for at least 10 cm (in the direction along which the plasma wake and the second pulse propagate), e.g. at least 20 cm, e.g. at least 50 cm, e.g. at least 1 m. This length of the plasma volume helps to helps to form the plurality of red-shifted sidebands and the plurality of blue-shifted sidebands in the spectrum of the second laser pulse, which in turn helps to form high-intensity peaks when the spectral phases of the sidebands is shifted relative to each other by the dispersive optical device.

The first and second laser pulses may be separated by any suitable and desired spacing. In a preferred embodiment the first (and, e.g., second) laser system(s) are arranged to generate and direct the first and second laser pulses into the plasma volume with a spacing (between the first and second laser pulses) of between 100 fs and 10 ps, e.g. between 500 fs and 5 ps, e.g. between 1 ps and 3 ps, e.g. approximately 1.7 ps.

The first or second laser system is arranged to direct the second laser pulse into the plasma volume such that when it interacts with the plasma wake formed in the plasma volume, a cascade of multiple red-shifted and multiple blue-shifted spectral sidebands ("satellites") are formed along the length of the second laser pulse, i.e. the second laser pulse is spectrally modulated, via a laser-plasma interaction, e.g. photon acceleration and electromagnetic cascading, between the second pulse and the plasma wake driven by the first pulse, to form the plurality of (alternating) red-shifted regions and the plurality of blue-shifted regions along the length of the second laser pulse.

After some propagation of the second pulse interacting with the varying refractive index of the plasma wake, along the length of the plasma volume, photon acceleration and electromagnetic cascading causes the creation of the red-shifted and blue shifted sidebands in the spectrum of the second pulse. Thus a spectral shift is temporally encoded in the frequency of the second pulse, which is observed as the red-shifted and blue shifted regions along the pulse and as red-shifted and blue-shifted sidebands in the spectrum of the pulse.

The number of red-shifted and blue shifted sidebands (i.e. the bandwidth of the modulated second pulse) may increase with the distance of propagation of the second pulse with the plasma wake through the plasma volume, e.g. the number of red-shifted and blue shifted sidebands is (linearly) proportional to the propagation distance (the length of the plasma volume). This may particularly be the case when the density of the plasma is relatively low, e.g. as outlined above, as this helps the different frequencies present to travel at the same speed, such that the second pulse remains smooth in the time domain.

In a preferred embodiment the (e.g. plasma volume is arranged such that the) second laser pulse is arranged to interact with the plasma wake to form an equal number of red-shifted regions and blue shifted regions. In a preferred embodiment the (e.g. plasma volume is arranged such that the) second laser pulse is arranged to interact with the plasma wake to form at least 5 red-shifted regions and at least 5 blue-shifted regions, e.g. at least 10 red-shifted regions and at least 10 blue-shifted regions, e.g. at least 25 red-shifted regions and at least 25 blue-shifted regions, e.g. up to approximately 50 red-shifted regions and up to approximately 50 blue-shifted regions.

Preferably the plasma volume (and, e.g., the plasma wake) is arranged (e.g. has a length, in a direction along which the laser pulses propagate) such that the red-shifted regions are equally spaced from each other (spatially) along the length (in the direction of propagation) of the second pulse (e.g. once the second pulse has propagated through the plasma volume). Preferably the plasma volume (and, e.g., the plasma wake) is arranged (e.g. has a length, in a direction along which the laser pulses propagate) such that the blue-shifted regions are equally spaced from each other (spatially) along the length (in the direction of propagation) of the second pulse (e.g. once the second pulse has propagated through the plasma volume).

Preferably the plasma volume (and, e.g., the plasma wake) is arranged (e.g. has a length, in a direction along which the laser pulses propagate) such that the red-shifted and the blue-shifted regions are equally spaced from each other (spatially) along the length (in the direction of propagation) of the second pulse (e.g. once the second pulse has propagated through the plasma volume). Thus preferably the plasma volume (and, e.g., the plasma wake) is arranged to generate the red-shifted and the blue-shifted regions such that they alternate with each other (spatially) along the length (in the direction of propagation) of the second pulse (e.g. once the second pulse has propagated through the plasma volume).

Preferably the plasma volume (and, e.g., the plasma wake) is arranged (e.g. has a length, in a direction along which the laser pulses propagate) such that each of the red-shifted regions is spaced (spatially) from an adjacent red-shifted region, along the length (in the direction of propagation) of the second pulse, by the electron plasma period (e.g. once the second pulse has propagated through the plasma volume). Preferably the plasma volume (and, e.g., the plasma wake) is arranged (e.g. has a length, in a direction along which the laser pulses propagate) such that each of the blue-shifted regions is spaced (spatially) from an adjacent blue-shifted region, along the length (in the direction of propagation) of the second pulse, by the electron plasma period (e.g. once the second pulse has propagated through the plasma volume).

It will be appreciated that when it is said that pulses (or regions of a pulse) are spaced (spatially) from each other by a time period (e.g. relative to the electron plasma period), this is the spacing over which the pulses (or regions of a pulse) will propagate in that time period, i.e. such that the distance may be equated with a time period.

Preferably the plasma volume (and, e.g., the plasma wake) is arranged (e.g. has a length, in a direction along which the laser pulses propagate) such that each of the red-shifted regions is spaced (spatially) from an adjacent blue-shifted region, along the length (in the direction of propagation) of the second pulse, by half the electron plasma period (e.g. once the second pulse has propagated through the plasma volume). Thus preferably the plasma volume (and, e.g., the plasma wake) is arranged (e.g. has a length, in a direction along which the laser pulses propagate) such that the plurality of red-shifted and blue-shifted regions are resonantly spaced along the length (in the direction of propagation) of the second pulse (e.g. once the second pulse has propagated through the plasma volume).

Preferably the plasma volume (and, e.g., the plasma wake) is arranged (e.g. has a length, in a direction along which the laser pulses propagate) such that substantially all the light from the central frequency of the second pulse (i.e. the original frequency of the second pulse as generated and incident upon the plasma volume) is red-shifted and/or blue-shifted into the red-shifted and/or blue-shifted regions (e.g. once the second pulse has propagated through the plasma volume).

After passing through the plasma volume, the red-shifted and blue-shifted regions are received by the dispersive optical device. Preferably the plasma volume is arranged such that the first pulse and the (red-shifted and blue-shifted regions of the) second pulse exit the plasma volume. Preferably the (e.g. plasma volume and the dispersive optical device of the) driver comprises a vacuum section that is arranged such that the first pulse and the (red-shifted and blue-shifted regions of the) second pulse exit the plasma volume into the vacuum section. This may allow the first pulse and the (red-shifted and blue-shifted regions of the) second pulse to expand in the vacuum section, which may be necessary to reduce the intensity of the pulses in order to help avoid damaging the material (e.g. sensitive mirrors) of the dispersive optical device.

In one set of embodiments the driver comprises a beam splitter arranged to separate the first pulse from the spectrally modulated second pulse, e.g. owing to the linear polarisation of the first pulse (and, e.g., the perpendicular linear polarisation of the second pulse). Preferably the beam splitter is arranged to prevent the first pulse from being received by the dispersive optical device.

The beam splitter may be arranged to direct (deflect or reflect) the first pulse away from the dispersive optical device. Thus, in this embodiment, preferably the beam splitter is arranged to allow the spectrally modulated second pulse to pass through the beam splitter to the dispersive optical device.

The beam splitter may be arranged (e.g. relative to the dispersive optical device) to allow the first pulse to pass through the beam splitter, such that the first pulse is not received by the dispersive optical device. Thus, in this embodiment, preferably the beam splitter is arranged to direct (deflect or reflect) the spectrally modulated second pulse towards (to be received by) the dispersive optical device.

The first pulse, e.g. after being separated from the second pulse by the beam splitter, may be retained by the driver (e.g. as opposed to being dumped or lost). For example, the first pulse may be used for injecting electrons into the plasma accelerator, the first pulse may be used as a diagnostic pulse, the first pulse may be used to generate the plasma or plasma waveguide in the accelerator plasma volume (the accelerator), or the first pulse may be used (e.g. be combined with the second pulse) to generate a plasma wake in the plasma accelerator.

A dispersive optical device is arranged, downstream of the plasma volume, to receive the second pulse having the plurality of red-shifted regions and the plurality of blue-shifted regions from the plasma volume. Thus preferably the dispersive optical device is optically coupled to the plasma volume. When the driver comprises a vacuum and/or a beamsplitter following plasma volume (preferably between the plasma volume and the dispersive optical device), preferably dispersive optical device is optically coupled to the vacuum and/or the beamsplitter. Thus for example, the dispersive optical device may be optically coupled to the plasma volume via the vacuum and/or the beamsplitter.

The dispersive optical device may comprise any suitable and desired dispersive optical device that is able to shift the spectral phases of the spectral sidebands relative to each other, e.g. to shift the plurality of the red-shifted regions and the plurality of the blue-shifted regions relative to each other. Preferably the dispersive optical device comprises a dispersive medium, a dispersive (e.g. chirped) mirror, a grating, a grating compressor or a piece of fused silica. Preferably the dispersive optical device is arranged to introduce a group delay dispersion.

The dispersive optical device is arranged to (temporally and thus spatially) shift the plurality of the red-shifted regions and the plurality of the blue-shifted regions relative to each other, such that the shifted regions are placed on top of each other (e.g. on the axis of propagation of coincident regions) to form a plurality of coincident pulses (a train of pulses in which pairs of red-shifted regions blue-shifted regions are coincident with each other).

Preferably the dispersive optical device is arranged to shift adjacent pairs of red-shifted regions and blue-shifted regions to form the plurality of coincident pulses, i.e. such that each pair of a red-shifted region and a blue-shifted region is shifted on top of each other to form a coincident pulse. Thus, in a particularly preferred embodiment, the dispersive optical device is arranged to shift each of a red-shifted region and a blue-shifted region of a pair of red-shifted and blue-shifted regions by half the electron plasma period of the plasma volume to form the plurality of coincident pulses.

Preferably the number of coincident pulses is equal to the number of red-shifted regions and equal to the number of blue-shifted regions. Thus preferably the (e.g. dispersive optical device of the) driver is arranged to form at least 5 coincident pulses, e.g. at least 10 coincident pulses, e.g. at least 25 coincident pulses, e.g. up to approximately 50 coincident pulses.

Preferably the (e.g. plasma volume and/or the dispersive optical device is arranged such that the) plurality of coincident pulses that are formed are equally spaced from each other (spatially) along the length (in the direction of propagation) of the coincident pulses (once the dispersive optical device has shifted the red-shifted regions and the blue-shifted regions). Preferably (e.g. the plasma volume and/or the dispersive optical device is arranged (to temporally shift the plurality of red-shifted regions and the plurality of blue-shifted regions relative to each other) such that) each of the plurality of coincident pulses is spaced (spatially) from an adjacent coincident pulse, along the length (in the direction of propagation) of the plurality of coincident pulses, by the electron plasma period of the plasma volume (once the dispersive optical device has shifted the red-shifted pulses and the blue-shifted pulses).

Preferably the (e.g. plasma volume and/or the dispersive optical device is arranged such that the) plurality of coincident pulses that are formed each have a pulse width that is significantly less than the electron plasma period of the plasma volume. Preferably the plurality of coincident pulses that are formed each have a pulse width (i.e. the pulse width of each individual pulse) that is less than 500 fs, e.g. less than 200 fs, e.g. less than 100 fs, e.g. less than 50 fs. This helps for driving the plasma wake in the plasma accelerator in an efficient way.

Preferably the coincident pulses have a frequency (i.e. the frequency at which successive coincident pulses of the plurality of coincident pulses are output for use in a plasma accelerator) of between 1 THz and 10 THz. Preferably the (e.g. first and/or second laser system of the) driver is arranged to generate the plurality of coincident pulses having a frequency (i.e. the frequency between successive pulse trains (i.e. the plurality of coincident pulses) that is greater than 100 Hz, e.g. greater than 500 Hz, e.g. greater than 1 kHz, e.g. greater than 2 kHz, e.g. greater than 10 kHz.

Preferably the driver comprises an optical focusing device for focusing the coincident pulses (from the dispersive optical device) into a plasma accelerator. In one embodiment the optical focusing device is separate (downstream) from the dispersive optical device and thus preferably the optical focusing device is optically coupled to the dispersive optical device for receiving the plurality of coincident pulses from the dispersive optical device.

In one embodiment the dispersive optical device comprises the optical focusing device, e.g. the dispersive optical device and the optical focusing device are an integral component that is arranged to shift the plurality of the red-shifted regions and the plurality of the blue-shifted regions relative to each other to form a plurality of coincident pulses and to focus the plurality of coincident pulses into a plasma particle accelerator for generating a plasma wake in the plasma particle accelerator. Having a combined dispersive optical device and optical focusing device may help to simplify the driver and make it easier to align optically.

The optical focusing device may comprise any suitable and desired focusing element, such as a mirror, lens or parabola. When the dispersive optical device comprises the optical focusing device, this combined component may, for example, comprise a chirped paraboloid that is arranged to both shift the red-shifted regions and the blue-shifted regions to form the coincident pulses and to focus the coincident pulses.

The invention also extends to a plasma particle accelerator and thus when viewed from a further aspect the invention provides a plasma particle accelerator comprising the driver according to the first aspect of this invention and an accelerator plasma volume (e.g. waveguide), wherein the driver is arranged to direct the plurality of coincident pulses for generating a plasma wake in the accelerator plasma volume (e.g. waveguide) of the plasma particle accelerator. Thus preferably the (e.g. dispersive optical device and/or the optical focusing device of the) driver is optically coupled to the accelerator plasma volume (e.g. waveguide) of the plasma particle accelerator.

Preferably the plasma volume (e.g. waveguide) of the plasma particle accelerator has a (e.g. axial) plasma (electron) density that is substantially equal to the (e.g. axial) plasma (electron) density of the plasma volume (e.g. waveguide) of the driver. This helps to match the train of pulses generated by the driver to the spacing that may be required to effectively generate a plasma wake (e.g. through resonant excitation) in the plasma volume (e.g. waveguide) of the plasma particle accelerator.

Preferably the plasma particle accelerator comprises a charged particle (e.g. electron, positron or muon) injector for injecting charged particles into the accelerator plasma volume (e.g. waveguide) of the plasma particle accelerator. The charged particle injector may, for example, comprise an external charged particle (e.g. electron, positron or muon) injector (e.g. an external electron accelerator) or a laser arranged to generate a pulse that ionises a dopant to generate the charged particles (e.g. electrons).

An embodiment of the invention will now be described, by way of example only, with reference to the accompanying drawings, in which.

Plasma accelerators offer a way to provide more compact and cost effective particle accelerators. Such accelerators require, for example, a laser driver to provide the input pulses to generate the plasma wake in the accelerator that is used to accelerate the charged particles, such as electrons.

An embodiment of a driver for a plasma accelerator will now be described.

Figure 1:
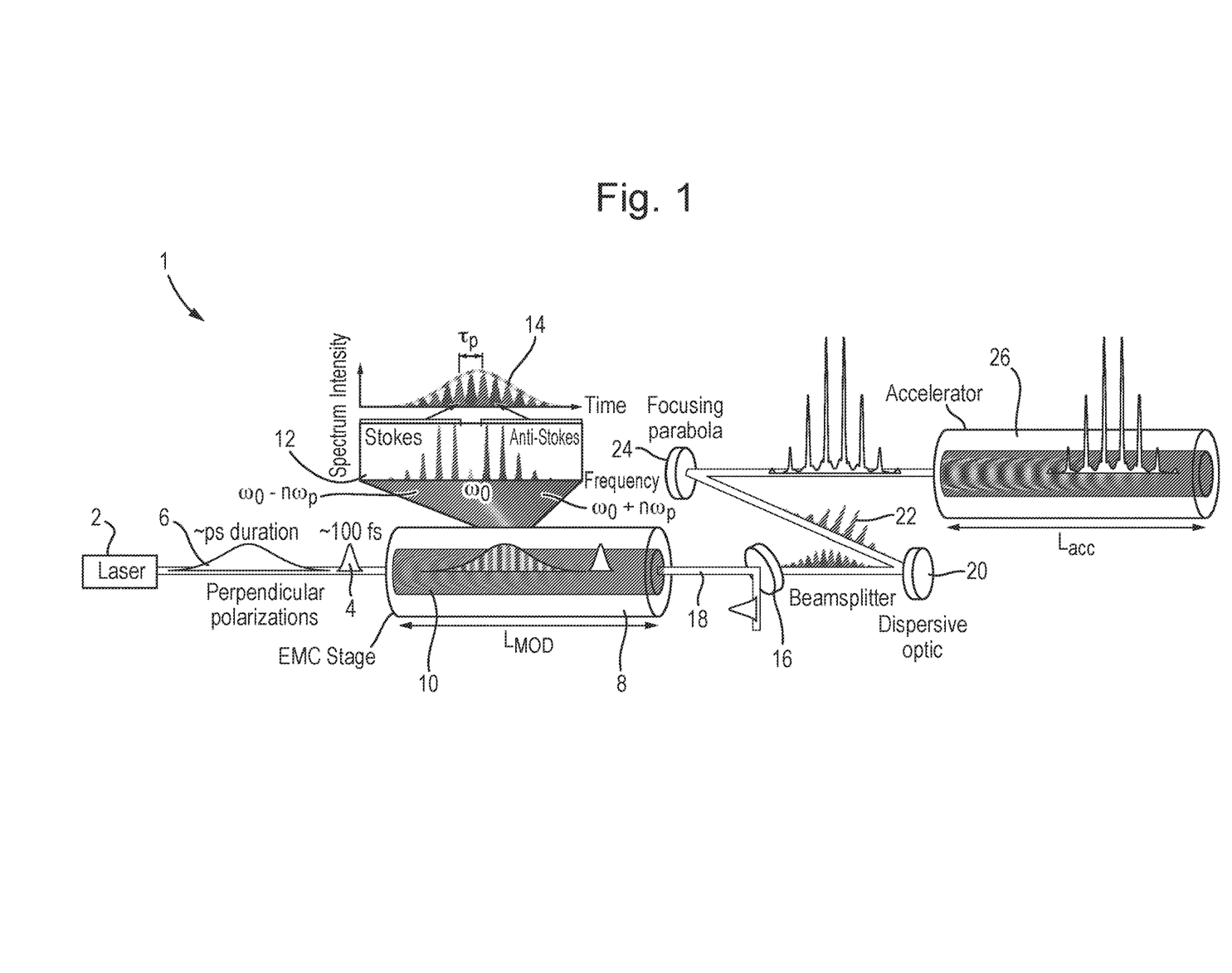
FIG. 1 shows a driver for a plasma accelerator in accordance with an embodiment of the present invention.

FIG. 1 shows a driver for a plasma accelerator in accordance with an embodiment of the present invention. The driver 1 includes a laser 2 (e.g. a Yb:YAG thin disk laser, e.g. a diode laser, e.g. a fibre laser), operating at a repetition frequency of at least 1 kHz and at a wavelength of 1030 nm, that is configured to generate a short (approximately 40 fs), linearly polarised laser pulse 4 having a pulse energy of 50 mJ. The laser 2 is also configured to generate a long (approximately 1 ps), smooth, linearly polarised laser pulse 6, having the same frequency as the short laser pulse 4 and having a pulse energy of 600 mJ. The pulse centroids are separated by 1.7 ps.

The laser 2 is optically coupled to a modulator stage 8, which contains a plasma waveguide 10, such that the laser 2 is configured to direct and focus the short laser pulse 4 and the long laser pulse 6 into the plasma waveguide, with the long laser pulse 6 shortly following the short laser pulse 4. The plasma waveguide 10 has a length, $L_{MOD}$ (e.g. of approximately 100 mm) and contains a plasma (an ionised gas) having an (electron) density of, e.g., approximately $2.5 \times 10^{17}$ cm$^{-3}$ along the central axis of the waveguide.

In operation of these components of the driver 1, the laser 2 generates the short pulse 4, which it directs into the plasma waveguide 10 of the modulator stage 8. The short pulse 4, which has a duration that is approximately equal to half of the electron plasma period of the plasma in the plasma waveguide 10, drives a low amplitude plasma wake in the plasma waveguide 10. The laser 2 generates the long pulse 6 which it directs into the plasma waveguide 10 of the modulator stage 8, to shortly follow the short pulse 4 (by 1.7 ps). In particular, the long pulse 6 is directed into the plasma waveguide 10 so to co-propagate through the plasma waveguide 10 with the plasma wake set up by the short pulse 4.

The long pulse 6 interacts with the plasma wake as they co-propagate, via an interaction of the second pulse with the plasma, owing to the varying refractive index of the plasma wake experienced by the long pulse 6. Photon acceleration and electromagnetic cascading, as the long pulse 6 co-propagates with the plasma wake, modulates the temporal phase of the long pulse 6 to form red-shifted and blue shifted satellites 12 in the spectrum of the long pulse 6, i.e. frequency sidebands at $\omega_0 = m\omega_{pe}$, where $\omega_0$ is the centre frequency of the pulse and $\omega_{pe}$ is the electron plasma frequency.

Beating of these satellites 12 forms multiple red-shifted and multiple blue-shifted pulses 14. Thus a temporal shift is encoded in the frequency of the long pulse 6, which is observed as the red-shifted and blue shifted pulses 14. It will be seen that substantially all of light from central (i.e. original) frequency in the spectrum of the long pulse 6 is shifted into the multiple red-shifted and multiple blue-shifted pulses 14. As shown in FIG. 1, if isolated, the red- (m<0) and blue-shifted (m>0) sidebands would form a pair of temporal pulse trains separated by half the electron plasma period. However, since both sets of sidebands are present, the temporal profile of the long pulse 6 is not changed by the temporal phase modulation and remains smooth.

As the long pulse 6 co-propagates and interacts with the plasma wake, the red-shifted and blue-shifted satellites 12 (and thus pulses 14) become spaced from each other along the length of the long pulse 6. After the long pulse 6 has traversed the length of the plasma waveguide 10, the red-shifted and blue-shifted pulses 14 are spaced from each other by half the electron plasma period, i.e. the red-shifted and blue-shifted pulses 14 alternate with each other along the length of the long pulse 6 with each red-shifted pulse being spaced from the adjacent blue-shifted pulse by half the electron plasma period).

The driver 1 also includes a beamsplitter 16 positioned at the output from the modulator stage 8. A vacuum section 18 between the modulator stage 8 and the beamsplitter 16 allows the short pulse 4 and the long pulse 6 to expand after exiting the EMC stage 8. The beamsplitter 16 is configured to separate the linearly polarised short pulse 4 from the linearly and perpendicularly polarised long pulse 6. The beamsplitter 16 allows the long pulse 6 to pass through and be retained in the driver 1, and the short pulse 4 to be disposed of.

The driver 1 further includes a dispersive optical device 20 that is positioned to receive the long pulse 6 with its red-shifted and blue-shifted satellites 12 (and thus pulses 14). The dispersive optical device 20 may, for example, be a dispersive (e.g. "chirped") mirror, a dispersive medium, a grating, a grating compressor, a plasma, or a piece of fused silica. Upon receiving the long pulse 6 with its red-shifted and blue-shifted pulses 14, the dispersive optical device 20 has the effect of shifting (compressing) the red-shifted and blue-shifted pulses 14 relative to each other. This results in the red-shifted and blue-shifted pulses 14 lying on top of each other to form a series of coincident pulses 22, separated by the electron plasma period.

The driver 1 further includes a focusing parabola 24 that is positioned to receive the series of coincident pulses 22. The focusing parabola 24 acts to focus the series of coincident pulses 22 into a plasma accelerator 26 having the same axial plasma density as the plasma waveguide 10. The series of coincident pulses 22 resonantly excite a high amplitude plasma wake in the plasma accelerator 26 (in a similar way to the short pulse 4 generating a plasma wake in the plasma waveguide 10 of the driver 1). This plasma wake in the plasma accelerator 26 can then be used to accelerate charged particles (e.g. electrons) injected into the plasma accelerator 26.

Figure 2A:
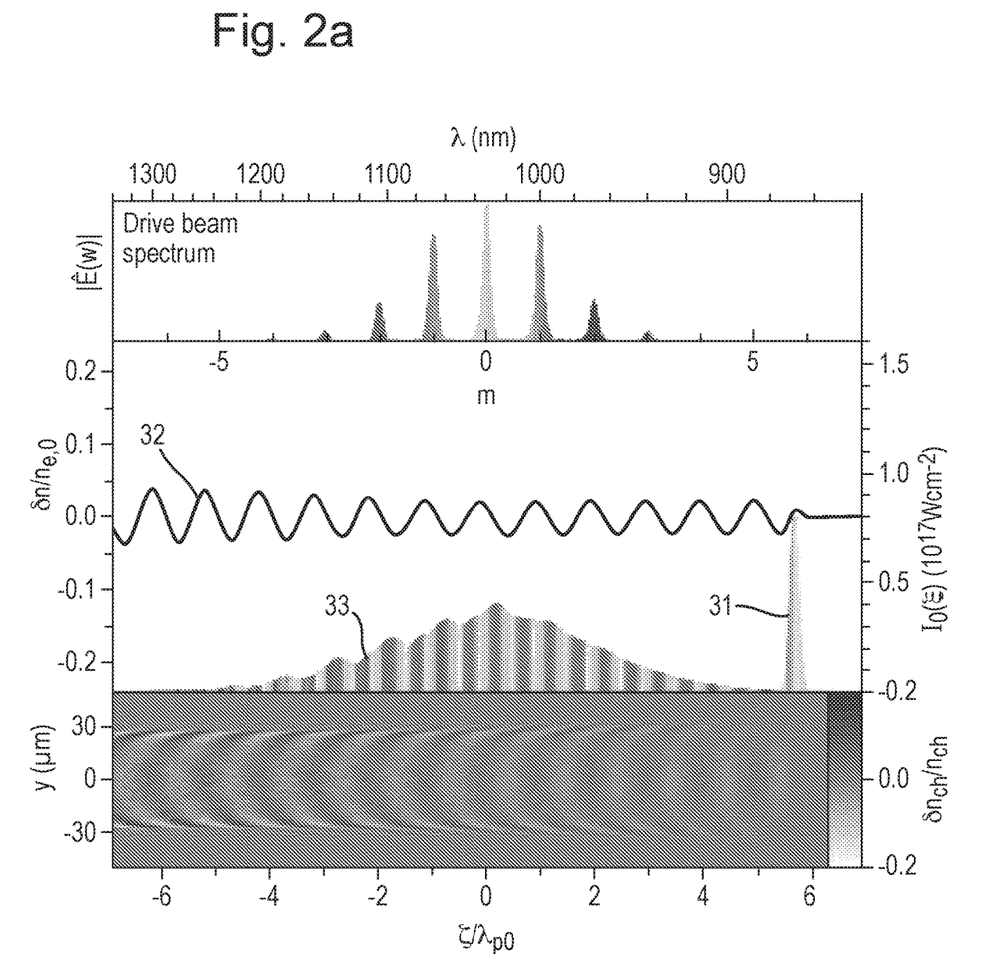
FIGS. 2a, 2b and 2c show simulations of the driver of FIG. 1 being used.
Figure 2B:
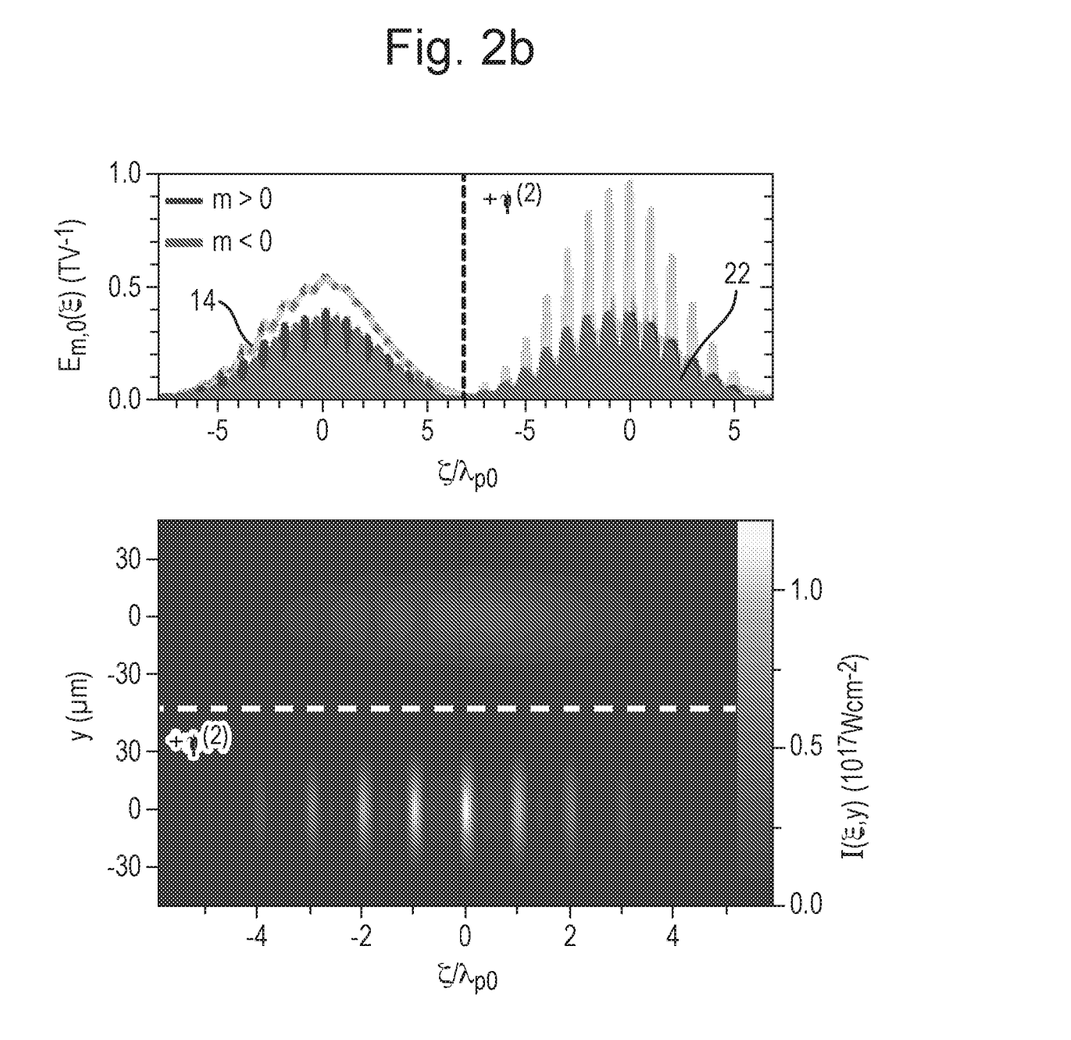
Figure 2C:
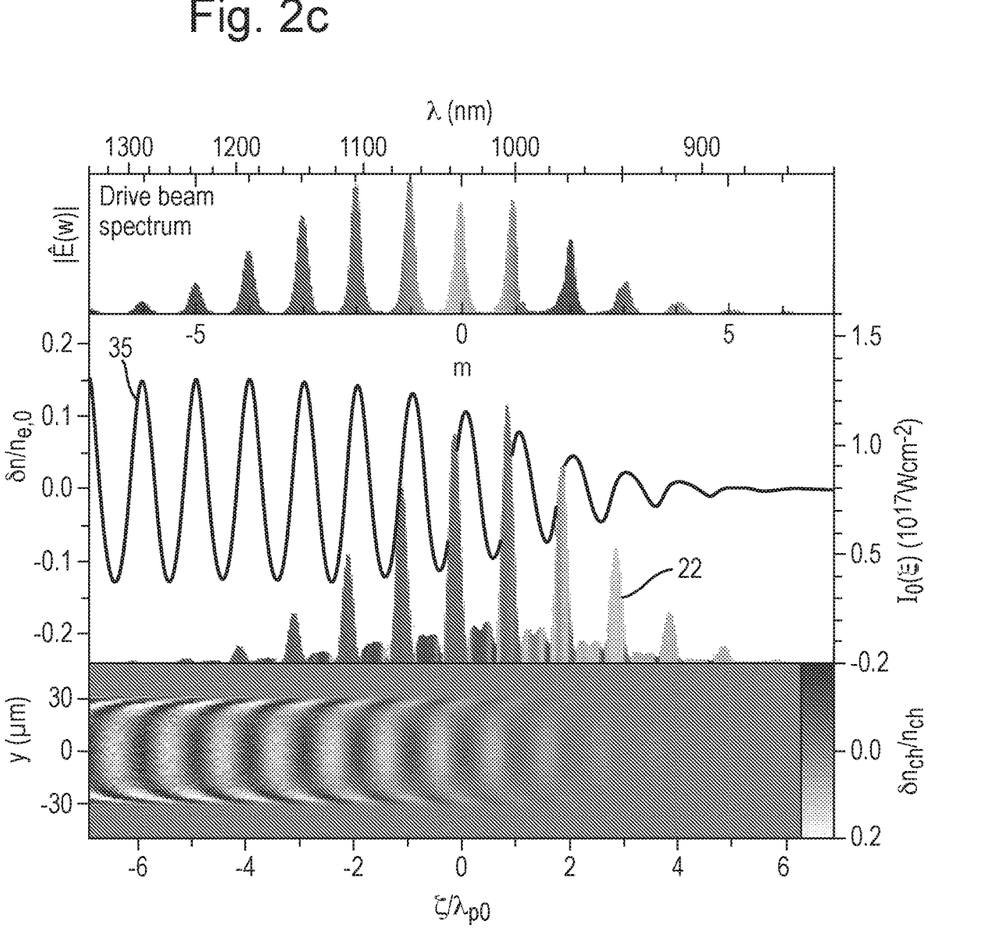

A simulation of the driver 1 shown in FIG. 1 is shown in FIGS. 2a, 2b and 2c. The simulation was performed with calculations using particle-in-cell (PIC) code EPOCH (Extendable Particle-in-cell (PIC) Open Collaboration) in 2D Cartesian geometry.

FIG. 2a shows the laser profiles 31, 32 of the short and long pulses 4, 6 respectively, with their spectral-spatial distribution after the short and long pulses 4, 6 have passed through the plasma waveguide 10 of the modulator stage 8 of the driver 1 shown in FIG. 1. The longitudinal length of the plasma waveguide 10 in the modulator stage 8 is 120 mm. The transverse extent of the plasma waveguide 10 in the modulator stage 8 is approximately 70 µm. The simulation shown is for a 40 fs (full width at half maximum (FWHM)), 50 mJ short pulse 4 and a 1 ps (FWHM), 600 mJ long pulse 6.

Also shown, underneath the laser profiles 31, 32 of the short and long pulses 4, 6, is the plasma wake 33 set up by the short pulse 4 in the plasma waveguide 10. The bottom panel shows the plasma wake in 2D, with the channel and transverse profiles of the laser as it exits the plasma waveguide 10 of the modulator stage 8.

FIG. 2a thus shows the plasma wake 33 set up in the plasma waveguide 10, driven almost entirely by the short pulse 4, and the modulation of the spectrum of the long pulse 6 by the plasma wake 33 to form the red-shifted and blue-shifted regions along the laser profile 32 of the long pulse 6.

FIG. 2b shows the red-shifted and blue-shifted pulses 14 after the long pulse 6 has passed through the plasma waveguide 10 of the modulator stage 8 (top left hand side of FIG. 2b) and then after the red-shifted and blue-shifted pulses 14 have been compressed by the dispersive optical device 20 to form the multiple coincident pulses 22 (top right hand side of FIG. 2b). As can be seen from the two dimensional normalised intensity profile of the long pulse 6 shown in the bottom of FIG. 2b, the intensity of the multiple coincident pulses 22 (as shown in the lower intensity profile) is significantly greater than that of the red-shifted and blue-shifted pulses 14 (as shown in the upper intensity profile) after compression by the dispersive optical device 20 (owing to the narrowing of the pulses).

FIG. 2c shows the intensity of the multiple coincident pulses 22 after compression by the dispersive optical device 20, and after propagating 50 mm in the accelerator stage. This shows that for a 1 ps (FWHM), 420 mJ long pulse 6 input into the plasma waveguide 10 of the EMC stage 8, the driver 1 produces multiple coincident pulses 22 each having a duration (FWHM) of 40 fs. This compares to a typical electron plasma period being used in the plasma accelerator 26 of 220 fs.

Underneath, in FIG. 2c is shown the plasma wake 35 generated by the multiple coincident pulses 22 when they are input to the plasma accelerator 26. Compared to the plasma wake 33 shown in FIG. 2a, it can be seen that the more intense coincident pulses 22 generate a significantly more intense plasma wake 35 than the plasma wake 33 generated by the single short pulse 4 in the plasma waveguide 10 of the modulator stage 8.

Simulations have shown that this intense plasma wake 35 is able to create a maximum electric field of 6 GV/m. Over an acceleration length of the plasma accelerator 26 of 14 cm, this is able to accelerate an electron beam to an energy of 400 MeV.

Figure 3:
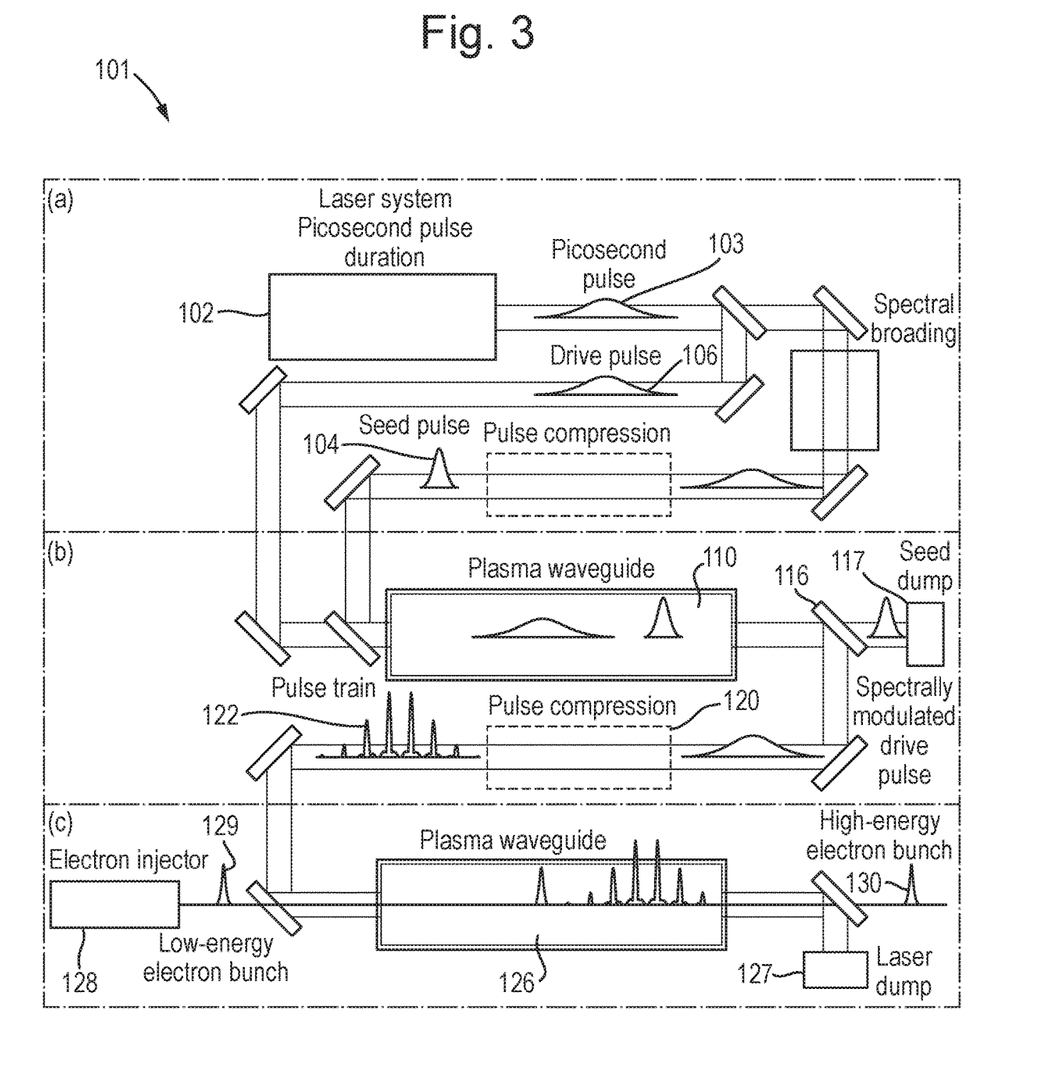
FIG. 3 shows a driver for a plasma accelerator in accordance with an embodiment of the present invention.

FIG. 3 shows a driver 101 for a plasma accelerator 126 in accordance with another embodiment of the present invention. The driver 101 shown in FIG. 3 is similar to the driver shown in FIG. 1. FIG. 3 shows one embodiment of how the short first "seed" laser pulse and the long second "drive" laser pulse are generated (shown in section (a) of FIG. 3).

The driver 101 includes a laser 102 that generates pulses 103 of a picosecond pulse duration. The pulse 103 is then split, e.g. by taking a pick-off of the pulse energy, to form the long second "drive" laser pulse 106 and the other part of the pulse is then spectrally broadened, e.g. in a hollow-core fibre or a gas-filled multi-pass cell, before being compressed, e.g. by a grating compressor or a chirped mirror compressor, to form the short first "seed" laser pulse 104. The polarisation direction of the seed pulse 104 may be rotated with respect to the drive pulse 106 using a half-wave plate.

Mirrors are then used to direct the short first "seed" laser pulse 104, followed by the long second "drive" laser pulse 106 into the plasma waveguide 110 of the modulator stage, shown in section (b) of FIG. 3.

In a similar manner to the driver in FIG. 1, a polarizing beamsplitter 116 reflects the long pulse 106 to be retained in the driver 101, and allows the short pulse 104 to pass through, so to be disposed of in a seed dump 117. The long drive pulse 106 is then spectrally modulated in the plasma waveguide 110 and compressed in a dispersive optical device 120 to generate the train of coincident pulses 122.

The train of coincident pulses 122 is focused into the plasma accelerator 126. The coincident pulses 122 resonantly excite a high amplitude plasma wake in the plasma accelerator 126. An electron injector 128 generates a bunch of low energy electrons 129 that is injected into the plasma accelerator 126 shortly after the train of coincident pulses 122. The plasma wake generated in the plasma accelerator 126 by the train of coincident pulses 122 is used to accelerate the electron bunch injected into the plasma accelerator 126, to output a high energy electron bunch 130 from the plasma accelerator 126.

A mirror after the plasma accelerator 126 reflects the train of coincident pulses 122 to be disposed of in a laser dump 127.

Figure 4:
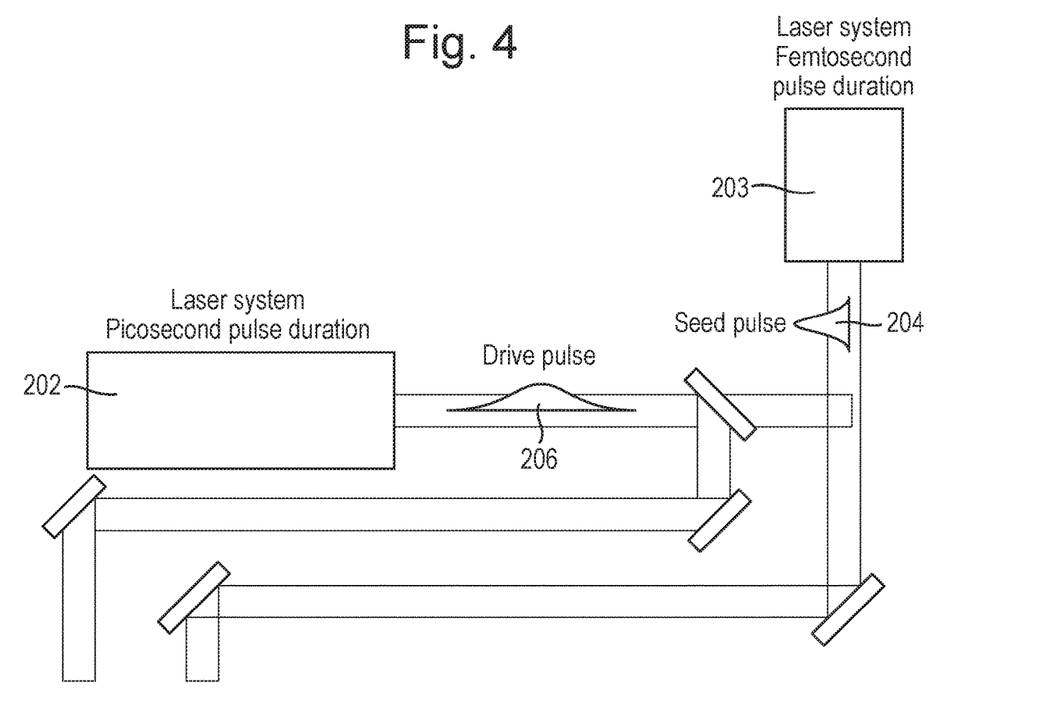
FIG. 4 shows part of a driver for a plasma accelerator in accordance with an embodiment of the present invention.

FIG. 4 shows part of a driver for a plasma accelerator in accordance with another embodiment of the present invention. FIG. 4 shows the first part of the driver, equivalent to that shown in part (a) of FIG. 3, showing how the short first "seed" laser pulse and the long second "drive" laser pulse may be generated, in a different way to that shown in section (a) of FIG. 3.

In the embodiment shown in FIG. 4, the driver includes two laser systems 202, 203 for generating the short first "seed" laser pulse 204 and the long second "drive" laser pulse 106 separately from each other. One laser 202 generates drive pulses 206 of a picosecond pulse duration. Another laser 203 generates seed pulses 204 of a femtosecond pulse duration.

Mirrors are then used to direct the short first "seed" laser pulse 204, followed by the long second "drive" laser pulse 206 into a plasma waveguide of a modulator stage of the driver, e.g. as shown in section (b) of FIG. 3.

Figure 5:
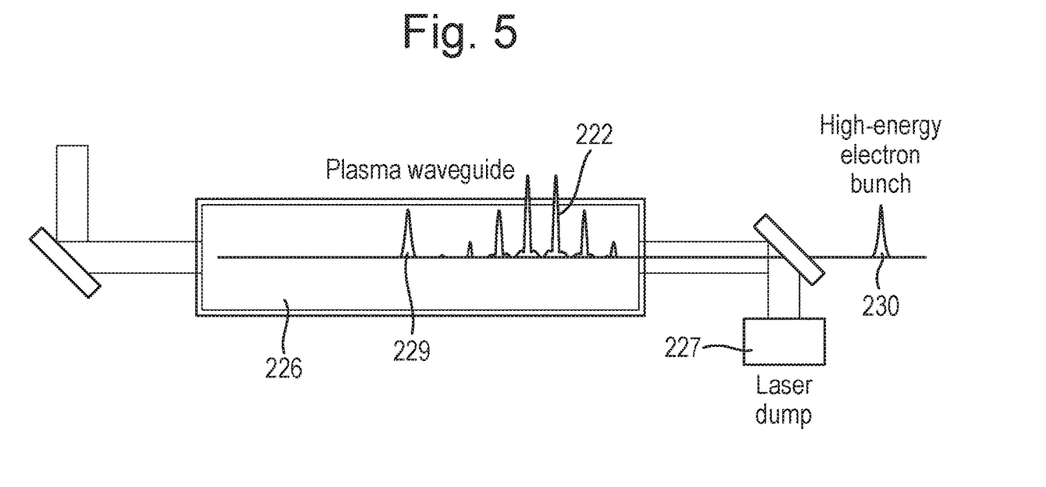
FIG. 5 shows part of a driver for a plasma accelerator in accordance with an embodiment of the present invention.

FIG. 5 shows part of a driver for a plasma accelerator in accordance with another embodiment of the present invention. FIG. 5 shows the last part of the driver, equivalent to that shown in part (c) of FIG. 3, showing how the electron bunch is generated.

In the embodiment shown in FIG. 5, the driver does not include a separate electron injector. Instead, an initial low-energy electron bunch 229 is generated in the plasma of the plasma accelerator 226 itself through, for example self-injection, shock-front injection or ionisation injection.

The train of coincident pulses 222, generated earlier in the driver (e.g. in part (b) of the driver shown in FIG. 4), resonantly excites a high amplitude plasma wake in the plasma accelerator 226. The plasma wake is used to accelerate the initial low-energy electron bunch 229, to output a high energy electron bunch 230 from the plasma accelerator 226.

In a similar manner as shown in FIG. 3, a mirror after the plasma accelerator 226 reflects the train of coincident pulses 222 to be disposed of in a laser dump 227.

Figure 6:
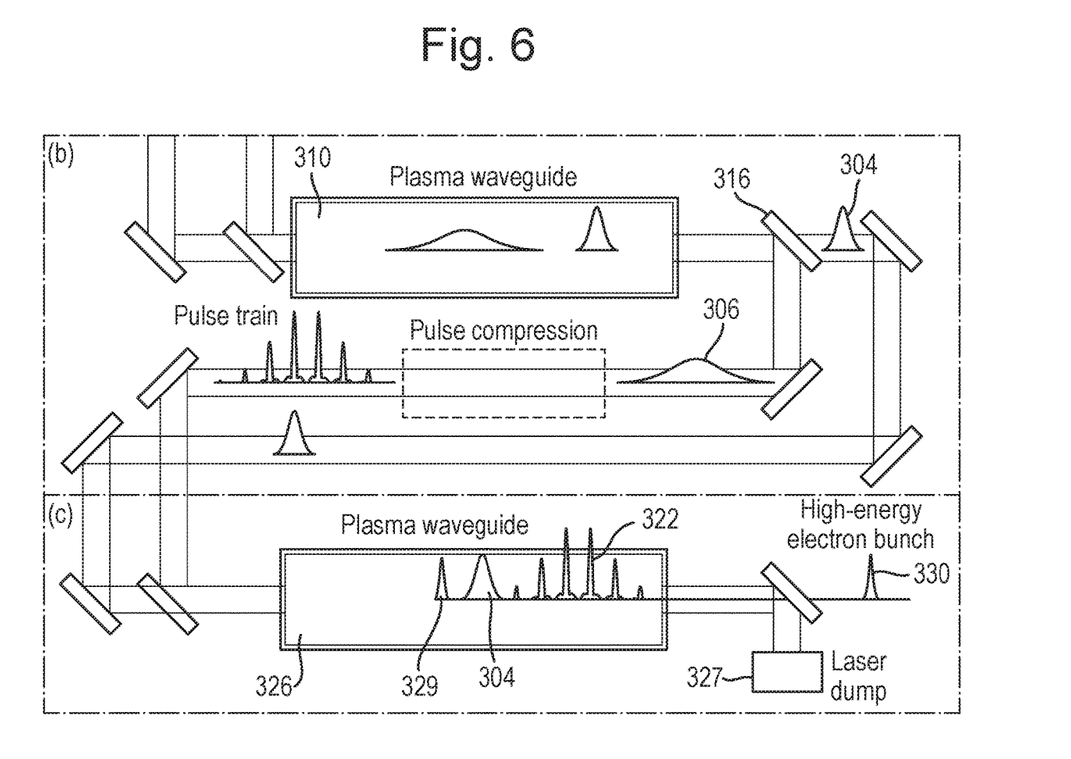
FIG. 6 shows part of a driver for a plasma accelerator in accordance with an embodiment of the present invention.

FIG. 6 shows part of a driver for a plasma accelerator in accordance with another embodiment of the present invention. FIG. 6 shows the latter two parts of the driver, equivalent to those shown in parts (b) and (c) of FIG. 3, showing how the train of coincident pulses and the electron bunch are generated.

In the embodiment shown in FIG. 6, the short first "seed" laser pulse 304 is not disposed of after being separated from the long second "drive" laser pulse 306 after passing through the plasma waveguide 310. Instead, after the short first "seed" laser pulse 304 and long second "drive" laser pulse 306 are separated by the polarizing beamsplitter 316, the short first "seed" laser pulse 304 is directed (via a series of mirrors) into the plasma accelerator 326.

In the plasma accelerator 326, the short first "seed" laser pulse 304 is repurposed to aid the generation of an initial low-energy electron bunch 329 through ionisation injection in the plasma of the plasma accelerator 326. In the same manner as shown in FIGS. 3 and 5, the train of coincident pulses 322, generated in part (b) of the driver, resonantly excites a high amplitude plasma wake in the plasma accelerator 326. The plasma wake is used to accelerate the initial low-energy electron bunch 329, to output a high energy electron bunch 330 from the plasma accelerator 326.

In a similar manner as shown in FIGS. 3 and 5, a mirror after the plasma accelerator 326 reflects the train of coincident pulses 322 to be disposed of in a laser dump 327, while allowing the high energy electron bunch 330 to pass through.

It can be seen from the above that in at least preferred embodiments of the invention, the driver creates trains of red and blue shifted pulses, which are then made coincident with each other, to form a train of narrow, intense pulses. This train of narrow pulses is then able to be used to efficiently generate the wake fields necessary for particle acceleration. It will be appreciated that this technique is able to exploit the use, for example, of contemporary laser technology that have a high average-power, a relatively high optical efficiency and a high repetition rate, but a relatively narrow bandwidth, in order to generate a series of relatively high energy pulses at a high repetition rate, that are desired by many accelerator applications. At least preferred embodiments of the present invention may therefore provide a mechanism for converting the high average-power, a relatively high optical efficiency and a high repetition rate of such lasers, into an effective driver for plasma particle accelerators.

It will be appreciated by those skilled in the art that many variations and modifications to the embodiments described above may be made within the scope of the various aspects and embodiments of the invention set out herein. For example, two lasers may be used to generate the short (first) and long (second) laser pulses.

Furthermore, while the preferred embodiments provide a driver for a plasma particle accelerator, the Applicant has appreciated that the driver may be used for other applications that require a train of laser pulses.

The invention claimed is:

1. A driver for a plasma particle accelerator, the driver comprising:
   a volume of plasma;
   a first laser system arranged to generate a first laser pulse,
      wherein the first laser pulse has a duration that is less than the electron plasma period of the plasma,
      wherein the first laser system is arranged to direct the first laser pulse into the volume of plasma, and
      wherein the first laser pulse is arranged to generate a plasma wake in the volume of plasma; and
   the first laser system or a second laser system arranged to generate a second laser pulse,
      wherein the second laser pulse is temporally smooth and has a duration that is greater than the electron plasma period and less than the ion plasma period of the plasma,
      wherein the first laser system or the second laser system is arranged to direct the second laser pulse into the volume of plasma, and
      wherein the second laser pulse is arranged to interact with the plasma wake to form a plurality of red-shifted regions and a plurality of blue-shifted regions along the length of the second laser pulse, thus forming a plurality of red-shifted sidebands and a plurality of blue-shifted sidebands in the spectrum of the second laser pulse;
   wherein the driver further comprises:
      a dispersive optical device arranged to receive the second pulse having the plurality of red-shifted regions and the plurality of blue-shifted regions,
      wherein the dispersive optical device is arranged to introduce a chromatic dispersion in the second laser pulse, so as to shift the spectral phases of the plurality of red-shifted sidebands and the plurality of blue-shifted sidebands, so as to temporally shift the plurality of red-shifted regions and the plurality of blue-shifted regions relative to each other, so as to form a plurality of coincident pulses for generating a plasma wake in a plasma particle accelerator.

2. The driver of claim 1, wherein the plasma volume comprises a plasma waveguide comprising a gradient refractive index plasma waveguide.

3. The driver as claimed in claim 1, wherein the plasma waveguide is formed in the volume of plasma when the first pulse is incident upon the plasma of the volume of plasma.

4. The driver as claimed in claim 1, wherein the volume of plasma comprises an optical fibre containing a plasma, a capillary tube containing a plasma, a capillary discharge waveguide containing a plasma or a hydrodynamic expansion plasma channel.

5. The driver as claimed in claim 1, wherein the volume of plasma has a length that is greater than its width.

6. The driver as claimed in claim 1, wherein the electron density of the plasma is less than $1 \times 10^{18}$ cm$^{-3}$.

7. The driver as claimed in claim 1, wherein the first laser system comprises a thin-disk laser, a fibre laser or a diode laser.

8. The driver as claimed in claim 1, wherein the first laser system comprises a first laser having a mean power that is greater than 100 W and/or a repetition rate that is greater than 100 Hz.

9. The driver as claimed in claim 1, wherein the first laser system is arranged to generate a linearly polarised first laser pulse, and the first or second laser system is arranged to generate a linearly polarised second laser pulse having a polarisation that is perpendicular to the polarisation of the first laser pulse.

10. The driver as claimed in claim 1, wherein the first laser system is arranged to generate the first laser pulse having an energy between 10 mJ and 200 mJ and/or a frequency between $3 \times 10^{13}$ Hz and $3 \times 10^{15}$ Hz; and
wherein the first or second laser system is arranged to generate the second laser pulse having an energy between 100 mJ and 2 J and/or a frequency between $3 \times 10^{13}$ Hz and $3 \times 10^{15}$ Hz.

11. The driver as claimed in claim 1, wherein the first laser system is arranged to generate the first pulse such that it has a duration that is less than half the electron plasma period; and/or
wherein the first or second laser system is arranged to generate the second pulse such that it has a duration that is greater than two times the electron plasma period of the plasma in the volume of plasma; and/or
wherein first or second laser system is arranged to generate the second pulse such that it has a duration that is less than half the ion plasma period of the plasma.

12. The driver as claimed in claim 1, wherein the first and/or second laser system(s) are arranged to direct the first and second laser pulses into the volume of plasma such that they co-propagate in the volume of plasma.

13. The driver as claimed in claim 1, wherein the volume of plasma is arranged such that the second pulse and the plasma wake co-propagate in the volume of plasma for at least 10 cm.

14. The driver as claimed in claim 1, wherein the first and/or second laser system(s) are arranged to generate and direct the first and second laser pulses into the volume of plasma with a spacing of between 100 fs and 10 ps.

15. The driver as claimed in claim 1, wherein the second laser pulse is arranged to interact with the plasma wake to form at least 5 red-shifted regions and at least 5 blue-shifted regions.

16. The driver as claimed in claim 1, wherein the volume of plasma is arranged to generate the red-shifted and the blue-shifted regions such that each of the red-shifted regions is spaced from an adjacent blue-shifted region, along the length of the second pulse, by half the electron plasma period.

17. The driver as claimed in claim 1;
wherein the driver comprises a vacuum section that is arranged such that the first pulse and the second pulse exit the volume of plasma into the vacuum section; and/or a beam splitter arranged to separate the first pulse from the second pulse;
and/or an optical focusing device for focusing the coincident pulses into the plasma accelerator.

18. The driver as claimed in claim 1, wherein the dispersive optical device comprises a dispersive medium, a dispersive mirror, a grating, a grating compressor or a piece of fused silica.

19. The driver as claimed in claim 1, wherein the plurality of coincident pulses that are formed are equally spaced from each other along the length of the coincident pulses by the electron plasma period of the plasma in the volume of plasma.

20. A plasma particle accelerator comprising the driver comprising:
a volume of plasma;
a first laser system arranged to generate a first laser pulse,
wherein the first laser pulse has a duration that is less than the electron plasma period of the plasma,
wherein the first laser system is arranged to direct the first laser pulse into the volume of plasma, and
wherein the first laser pulse is arranged to generate a plasma wake in the volume of plasma; and
the first laser system or a second laser system arranged to generate a second laser pulse,
wherein the second laser pulse is temporally smooth and has a duration that is greater than the electron plasma period and less than the ion plasma period of the plasma,
wherein the first laser system or the second laser system is arranged to direct the second laser pulse into the volume of plasma, and
wherein the second laser pulse is arranged to interact with the plasma wake to form a plurality of red-shifted regions and a plurality of blue-shifted regions along the length of the second laser pulse, thus forming a plurality of red-shifted sidebands and a plurality of blue-shifted sidebands in the spectrum of the second laser pulse;
wherein the driver further comprises:
a dispersive optical device arranged to receive the second pulse having the plurality of red-shifted regions and the plurality of blue-shifted regions,
wherein the dispersive optical device is arranged to introduce a chromatic dispersion in the second laser pulse, so as to shift the spectral phases of the plurality of red-shifted sidebands and the plurality of blue-shifted sidebands, so as to temporally shift the plurality of red-shifted regions and the plurality of blue-shifted regions relative to each other, so as to form a plurality of coincident pulses for generating a plasma wake in a plasma particle accelerator; and
an accelerator volume of plasma;
wherein the driver is arranged to direct the plurality of coincident pulses for generating a plurality of plasma wakes in the accelerator volume of plasma of the plasma particle accelerator.

* * * * *